United States Patent
Goodwin, III

(10) Patent No.: US 7,406,437 B2
(45) Date of Patent: Jul. 29, 2008

(54) SYSTEM AND METHOD FOR DIRECTING CUSTOMERS TO PRODUCT LOCATIONS WITHIN A STORE

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 1901 days.

(21) Appl. No.: 09/726,820

(22) Filed: Nov. 30, 2000

(65) Prior Publication Data

US 2002/0065714 A1      May 30, 2002

(51) Int. Cl.
*G06Q 30/00* (2006.01)
*G01S 1/00* (2006.01)

(52) U.S. Cl. .................. 705/14; 705/26; 342/357.09
(58) Field of Classification Search .............. None
See application file for complete search history.

(56) References Cited

U.S. PATENT DOCUMENTS

| | | | |
|---|---|---|---|
| 4,882,724 A | 11/1989 | Vela et al. | |
| 4,974,170 A | 11/1990 | Bouve et al. | |
| 5,250,789 A | 10/1993 | Johnsen | |
| 5,295,064 A | 3/1994 | Malec et al. | |
| 5,369,571 A | 11/1994 | Metts | |
| 5,418,354 A | 5/1995 | Halling et al. | |
| 5,729,697 A | 3/1998 | Schkolnick et al. | |
| 5,870,716 A * | 2/1999 | Sugiyama et al. | 705/26 |
| 5,887,271 A * | 3/1999 | Powell | 705/14 |
| 5,963,948 A | 10/1999 | Shilcrat | |
| 6,123,259 A * | 9/2000 | Ogasawara | 235/380 |
| 6,314,406 B1 * | 11/2001 | O'Hagan et al. | 705/14 |

(Continued)

FOREIGN PATENT DOCUMENTS

EP      1 003 119      5/2000

*Primary Examiner*—Yehdega Retta
(74) *Attorney, Agent, or Firm*—Maginot, Moore & Beck LLP

(57) ABSTRACT

A method to provide directions to customers requesting information about the location of products in a store that brings the customer into the vicinity of other products in which the customer may have an interest to purchase receives customer identification data and product selection data, determines customer interest data from the customer identification data, and generates a customer path to a location corresponding to the product selection data that includes a location corresponding to the customer interest data. A customer following the generated path comes into the vicinity of one or more products in which the customer may have an interest to purchase. A customer may enter the identification data through a keypad or through a scanning device that reads a customer token. Preferably, the customer token may be a smart card or a card bearing a magnetic stripe. A keypad or touch screen may be used to provide product selection data. The location of a selected product and the location of the kiosk where the data was entered define an endpoint and a starting point for the customer's path, respectively. The customer identification data may be used to query a database for the customer's purchase history at the store or to ascertain demographic data. These data may be used to identify products that the customer may be interested in purchasing. The locations of these products are used to define a customer's path to the selected product. The display of this path is made without reference to the portions of the store containing other products not corresponding to the customer's interests. A system to implement the method is also disclosed.

9 Claims, 4 Drawing Sheets

U.S. PATENT DOCUMENTS 6,456,981 B1 * 9/2002 Dejaeger et al. ............... 705/14
6,513,017 B1 * 1/2003 Howard et al. ................ 705/28
6,587,835 B1 * 7/2003 Treyz et al. ................... 705/14
6,604,681 B1 * 8/2003 Burke et al. ................. 235/383

* cited by examiner

SYSTEM AND METHOD FOR DIRECTING CUSTOMERS TO PRODUCT LOCATIONS WITHIN A STORE

TECHNICAL FIELD OF THE INVENTION

This invention relates generally to methods and systems for communicating with shoppers within a store and, more particularly, to methods and systems for identifying product locations within a store.

BACKGROUND OF THE INVENTION

In large stores, sometimes called 'big-box' stores, customers are presented with a vast collection of items and goods for purchase. These stores offer merchandise as diverse as groceries, clothing, hardware, and garden supplies. While this bewildering array of products facilitates 'one stop' shopping, it may frustrate customers who search in various departments without information as to where a product for which they are looking is located.

To assist shoppers in locating products, various systems and methods have been developed. One such system is disclosed in U.S. Pat. No. 4,882,724 to Vela et al. That system includes relay units mounted in shopping carts that wirelessly communicate with a central computer for information. To shop, a database of all items offered for sale in the store is downloaded to a relay unit in a cart when a customer activates the relay unit. The customer selects the items the customer wants to purchase from the list and these selected items are used to generate a shopping list of selected product records. A map of the store's layout may be generated on the display and the locations of selected products may be indicated on the map. Using this information, the customer directs the cart around the store alerted to the location of selected products.

While the system of Vela et al. does provide a customer with insight regarding the location of products, it has some significant limitations. For one, the customer has to wait while a database of all products is downloaded. Another limitation is that the customer has to construct a shopping list from the displayed database. Most customers come to a store with a list of items that the customer wants to purchase. Using that list to generate a list compatible with the system of Vela et al. is probably more tedious a task than most customers care to perform. This system also requires the use of a relay unit for each shopping cart and requires a customer to use a shopping cart in order to benefit from the system.

Another shopping cart system is disclosed in U.S. Pat. No. 5,729,697 to Schkolnick. That system also uses computers mounted in shopping carts for communication with a central unit. The customer may request a map of the store's layout through the display for the computer mounted in the cart. The displayed map may indicate the location of on-sale or special interest items. Again, a customer must use a shopping cart to exploit the advantages of the system and each shopping cart must include a computer. Thus, the cost of implementing such a system may be prohibitive in stores maintaining an extensive number of shopping carts. U.S. Pat. No. 5,250,789 to Johnsen includes a floppy disk drive with the computer mounted in the shopping cart so the user may bring a shopping list. In the system of this patent, shopping lists may also be generated by customers manually identifying products through a keyboard, scanning bar codes from specially generated register tapes, and by downloading a list through telephone modem communications. Again, the system requires a computer unit to be mounted in each cart and customers must use a cart to access to the system. U.S. Pat. No. 5,295,064 to Malec et al. also requires a customer to use a cart having a computer mounted in it to receive a display of a map of the store layout.

U.S. Pat. No. 5,887,271 to Powell uses a kiosk that identifies the location of products that correspond to electronic discount coupons stored on a smart card. The smart card is inserted into the kiosk and the kiosk responds with a display of a map of the store layout with an indication of the locations of the discounted products. This system does not require a customer to use a cart having a computer mounted therein. However, the store is not able to use the kiosk or the card data to improve the revenue potential possible from the customer. Some of the systems noted above, such as Vela et al., do attempt to interest a customer in other unplanned purchases by displaying ads on the cart display when the customer brings the cart into the vicinity of the product that is the subject of the transmitted ad. However, this marketing system requires the relatively expensive cart communication system.

What is needed is a way of using a customer's interest in obtaining product information to increase the potential of purchases by the customer.

What is needed is a way for a store to enhance interest in the products on site without requiring portable cart communication devices.

SUMMARY OF THE INVENTION

The above-noted marketing limitations of previously known methods for providing product information to customers have been overcome by a system and method that operate in accordance with the principles of the present invention. The method of the present invention includes receiving customer identification data and customer product selection data, generating customer interest data from the customer identification data, and generating a customer path to a product corresponding to the customer product selection data. The path includes one or more locations that correspond to the customer interest data.

A customer may enter customer identification data and provide product selection data through a keypad or through a scanning device that reads a customer token. Preferably, the customer token may be a smart card or a card bearing a magnetic stripe, although a token bearing a bar code may also be used. A keypad or touch screen may be used to provide product selection data. The location of a selected product and the location of a kiosk where the customer enters data define an endpoint and a starting point for the customer's path, respectively. The customer identification data may be used to query a database containing the customer's purchase history at the store or to obtain demographic data corresponding to the customer. These data may be used to identify products that the customer may be interested in purchasing. The locations of these products are used to reconstruct the customer's path to the customer selected product. The display of this path is made without reference to the portions of the store containing other products not corresponding to the customer's interests. In this manner, the customer may be routed through the store on a path that increases the potential for the purchase of goods other than those for which the customer entered the store.

The method of the present invention may be implemented with a system made in accordance with the principles of the present invention. The system includes a data receiver for receiving customer identification and customer product selection data, a customer interest data generator for generating customer interest data from the customer identification data, and a customer path generator for generating a customer path to a location corresponding to the customer product selection data and the path includes at least one location corresponding to the customer interest data. The data receiver is a computer that may be coupled to a keypad, barcode reader, or smart card reader. The data receiver may also include a touch screen through which a customer may identify selected products. The data receiver may send the customer identification data, customer product selection data, and receiver location data to the customer interest data generator for identification of customer interests. The customer interest data generator may be a server coupled to a database of customer information. The server may use the customer identification data to query a database for demographic data corresponding to the customer that is stored in the database or for purchase history records. These data may be used to determine products that may interest the identified customer. The demographic data may be compared to data lists of products likely to interest persons corresponding to the retrieved demographic data. The location of the products likely to interest the identified customer are provided with location data corresponding to the products selected by the customer to the customer path generator. The customer path generator may be a computer program implemented at the server or at the data receiver. The customer path generator determines a path through the store that, if followed, takes the customer into the vicinity of at least one of the products of interest. This path is preferably provided to the customer through a display or printout. The displayed or printed route does not show the entire store layout to reduce the likelihood that the customer plan a route that does not bring the customer into the vicinity of the products of interest. To facilitate use of the data receiving device and encourage use of the invention, a store may issue customer tokens, such as plastic cards, that contain customer identification data stored in the memory of a smart card or encoded on a magnetic stripe affixed to the token.

It is an object of the present invention to route customers by product locations that increase the probability that the customer will purchase goods other than the ones identified by the customer for location.

It is an object of the present invention to direct customers to products in a store without giving the customer an entire layout of the store.

These and other advantages and features of the present invention may be discerned from reviewing the accompanying drawings and the detailed description of the invention.

BRIEF DESCRIPTION OF THE DRAWINGS

The present invention may take form in various circuit and method components and arrangement of circuit and method components. The drawings are only for purposes of illustrating an exemplary embodiment and are not to be construed as limiting the invention.

DETAILED DESCRIPTION OF THE INVENTION

Figure 1:
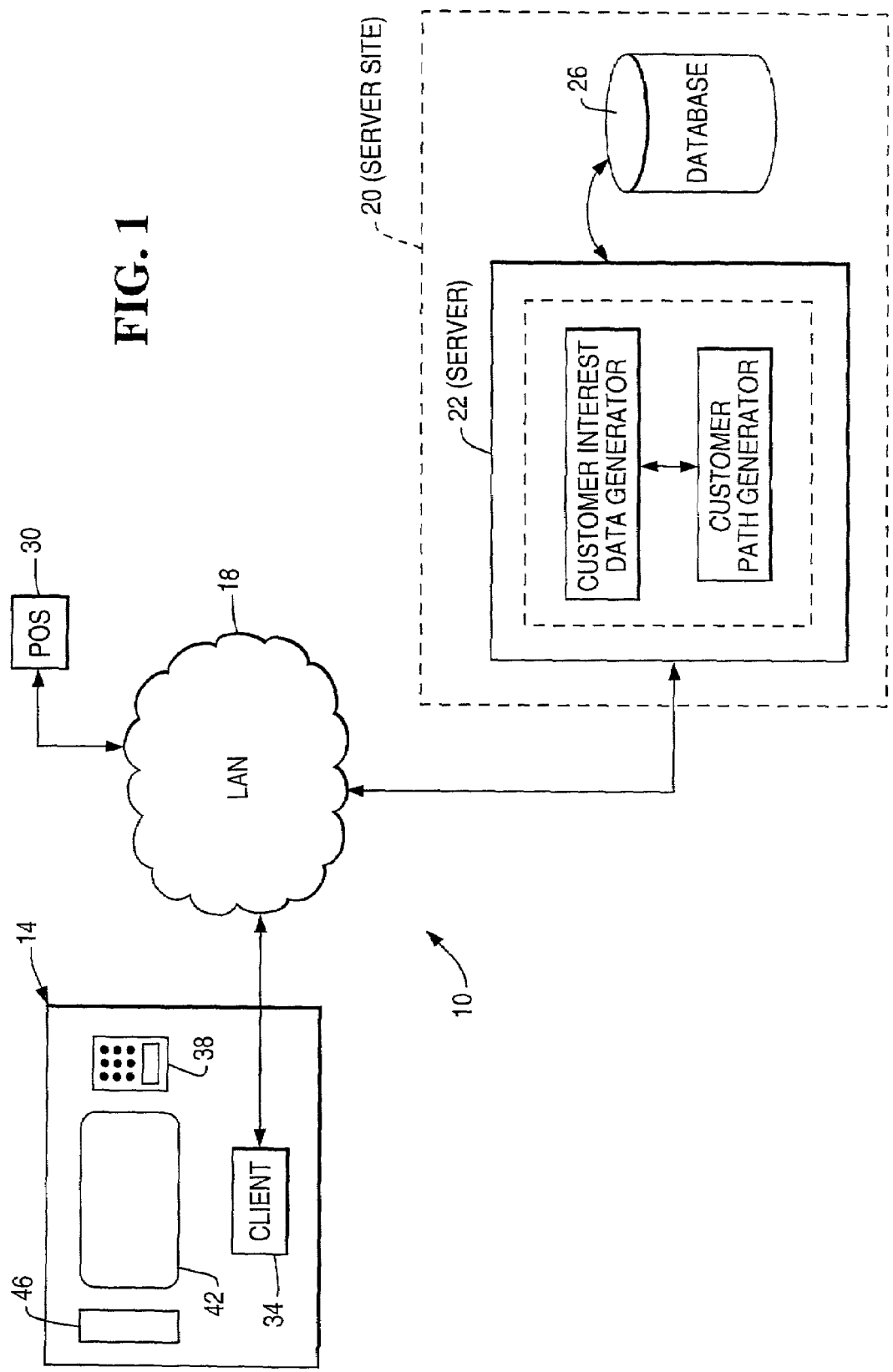
FIG. 1 depicts a block diagram of a first embodiment of a system that may be used to direct a customer to a product in a store in a way that increases the probability that the customer buys a product other than a selected one identified by the customer.

An exemplary system embodying the present invention is shown in FIG. 1. System 10 may include a customer kiosk 14, a local area network (LAN) 18, and a server site 20. Server site 20 includes a server computer 22 and a database 26. One or more point-of-sale (POS) terminals 30 may also be coupled to LAN 18 to provide purchase data for updating database 26. Customer kiosk 14 includes a client computer 34, a keypad 38, a display 42, and card reader 46. Alternatively, display 42 may also include a touch screen that may be used to implement a keypad or menu driven selection device so that keypad 38 is not required. Card reader 46 may be any known magnetic stripe or smart card reader. To encourage use of kiosk 14, a store may issue magnetic stripe or smart cards that store customer identification data. These data may include customer name, social security number, birth date, address, income level, martial status, family size, gender, job data, education level, and past buying history. Smart cards are able to contain more data than magnetic cards but both types of cards are capable of storing sufficient information to uniquely identify a customer. Kiosk 14 has stored within client 34 an identifier that identifies the location of kiosk 14 within a store, if more than one kiosk is coupled to LAN 18. These various data collected by kiosk 14 may be sent to server 22 for determination of products in which a customer may have an interest to purchase and the locations of these products. Alternatively, computer 34 may use these data for these purposes if kiosk 14 is a stand alone station and is not coupled to LAN 18. Both implementations are discussed more fully below.

In an exemplary embodiment of the present invention, client computer 34 and server 22 may be computer systems that use Pentium processors operating at 266 MHz, having 64 MB of RAM and a hard disk storage capacity of 4.3 GB. Server 22 may have more RAM and hard disk storage than client computer 34 if server 22 communicates with and processes data from more than one kiosk 14. Computers 34 and 22 may use the Windows 95 or higher operating system or equivalent. Database 26 may be a known relational database or a known object repository.

At server site 20, server 22 receives data identifying a customer at kiosk 14, a product that the customer is trying locate, and a kiosk identifier. Customer identification data is preferably used to query database 26 and retrieve demographic data about the identified customer and/or purchase history data corresponding to the identified customer. A computer program resident on server 22 functions as a customer interest data generator to identify products that may interest the customer. The customer interest data generator may also use date and time data to identify products for an upcoming holiday or family event, such as a birthday. Identifiers for these customer interest products may be used to query database 26 and ascertain the location and availability of the identified customer interest products in the store. Likewise, the data regarding the product for which the customer requested location data are used to query database 26 and obtain a product location. The kiosk location corresponding to the kiosk identifier, the product location for the customer identified product, and the location of customer interest products are used by a customer path generator to generate a route through the store to the product corresponding to the customer product selection data. Customer path generator is preferably a computer program that resides on server 22. Using the customer identified product location as an endpoint and the kiosk location as the starting point, customer path generator constructs a path to the endpoint that takes the customer in the vicinity of one or more customer interest products in the store. Preferably, the path is provided in visual form as a map of a portion of the store layout with the generated path marked thereon. Alternatively, the path may be provided in textual directions. A file containing either form is provided over LAN 18 to kiosk 14 so client 34 may display the path on display 42.

Preferably, the customer path is provided with only the portion of the store layout showing that contains the customer interest product locations. The names of the departments containing the customer interest goods may be highlighted to entice the customer to follow the generated path. By excluding portions of the store layout, a customer is provided with insufficient information to construct a shorter path or one that avoids the products of interest in favor of time considerations or the like. By directing customers to the vicinity of products that arguably interest the customer or that correspond with an upcoming need in the customer's family, the revenue generating potential of the customer's visit is increased.

Figure 4:
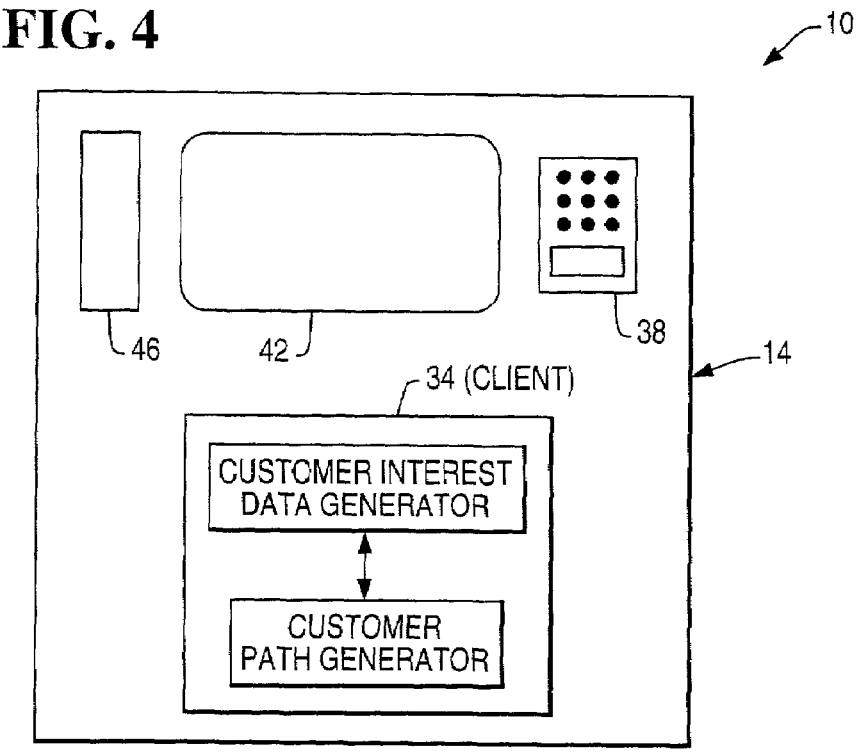
FIG. 4 a second embodiment of a system that may be used to direct a customer to a product in a store in a way that increases the probability that the customer buys a product other than a selected one identified by the customer.

In an alternative embodiment, as shown in FIG. 4, kiosk 14 may be a stand alone station. The stand alone embodiment has software resident in client computer 34 that uses demographic data from a customer token or customer responses to select products of interest from a database or data file kept at client 34. For example, the zip code read from the magnetic stripe of a customer's card may be used to select products of interest corresponding to the median or mean income of the area represented by the zip code. When a customer uses a smart card to identify himself or herself, more data are available for determining a product that is likely to catch a customer's interest as he or she moves through the store to the product for which the customer requested directions. If kiosk 14 is implemented without a card reader or if customers without cards are to be encouraged to use kiosk 14, identification and demographic information may be obtained by displaying questions on display 42 and receiving answers through a keypad or touch screen. The customer path generator software also resides in the client computer 34 of this embodiment. Alternatively, customer interest data generator and customer path generator may be implemented with their own computer systems or processors with memory that are housed within kiosk 14.

Figure 5:
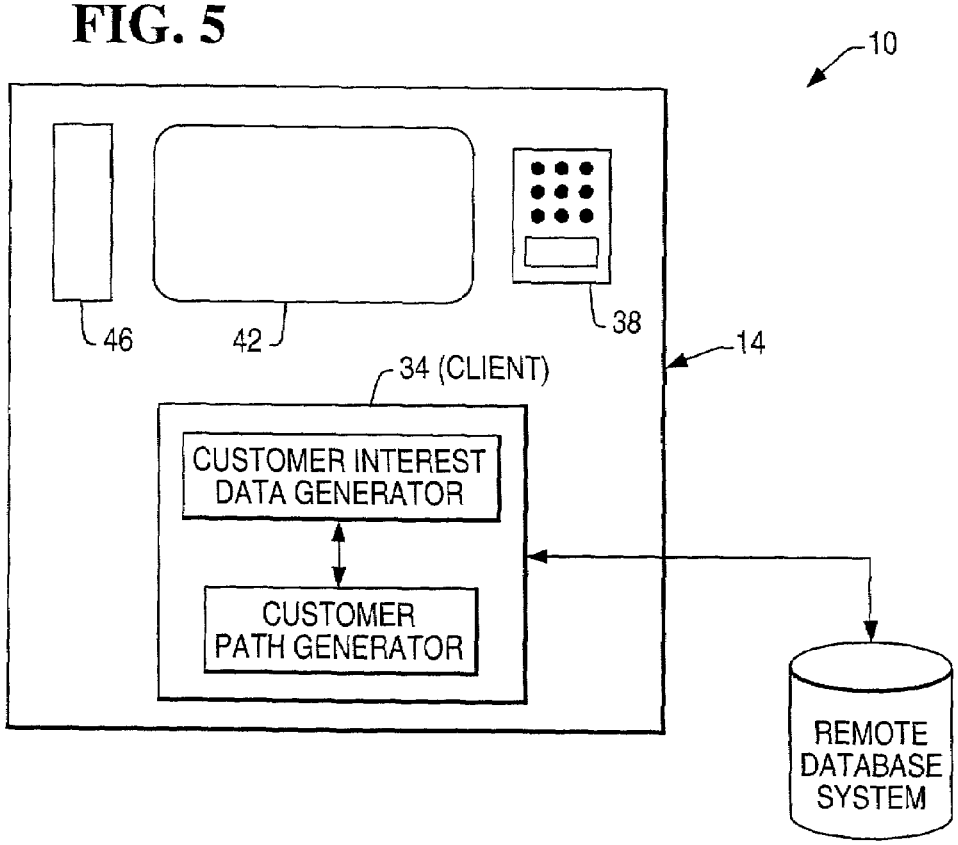
FIG. 5 a third embodiment of a system that may be used to direct a customer to a product in a store in a way that increases the probability that the customer buys a product other than a selected one identified by the customer.

In another alternative embodiment, as shown in FIG. 5, client computer 34 communicates with a database system located remotely from kiosk 14 for queries to obtain customer data corresponding to the customer identification data and customer product selection data. However, the customer interest data generator and customer path generator are implemented in software residing in computer 34 or in processors housed in kiosk 14. At the beginning of interaction with a customer, computer 34 may use the customer identification data that it obtains through a card reader or keypad to generate a customer data query for the remotely located database. The query is sent over a LAN or other computer communication network to the database system for processing. In response, the database system 'scrapes' the database for the identified customer data and sends these data over the communication network to the client 34. With the customer's data sent by the database, kiosk 14 may operate without further interaction with the database system. This one retrieval of all the data that might be necessary for generation of a path for a customer reduces delay caused by waiting for responses from computers not located at kiosk 14.

In all of the embodiments discussed above, POS terminal 30 provides data regarding purchases made by the customer during the store visit. These data are provided to server 22 for storage in database 26. These data may be used to generate maps for other products that the customer requested during the store visit. The updating of a purchase history stored in a database with data from a POS terminal is well-known.

OPERATION OF THE PRESENT INVENTION

Figure 2:
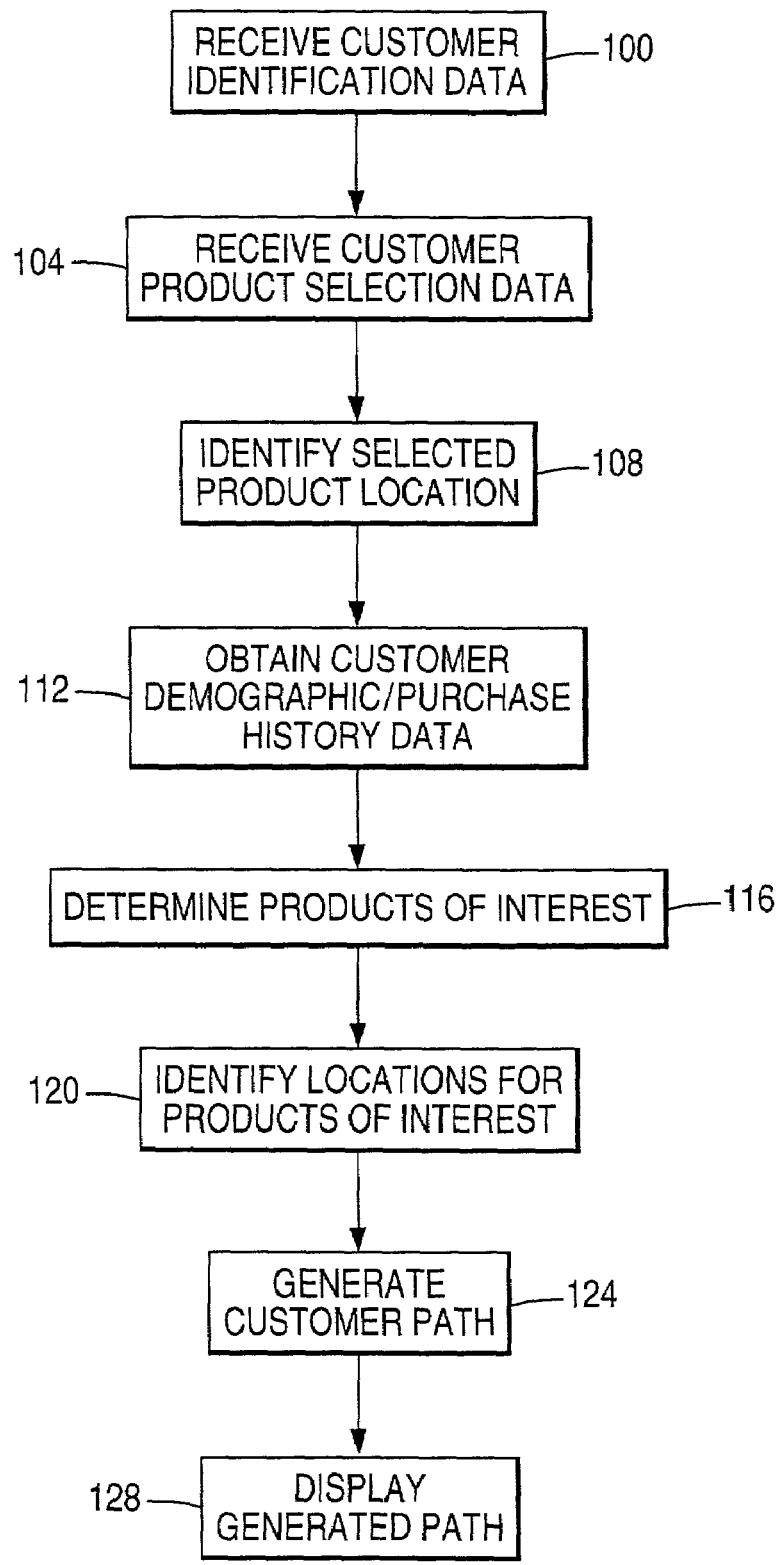
FIG. 2 is a flowchart of an exemplary method for directing customers to the vicinity of products that may interest a customer.

An exemplary method implemented by server 22 in accordance with the principles of the present invention is shown in FIG. 2. The method begins by receiving from kiosk 14, customer identification data (Block 100) and customer product selection data for the product(s) for which the customer wants kiosk 14 to generate a route (Block 104). The product identification data is used to query database 26 and identify a location for the customer selected products (Block 108). The customer identification data is used to retrieve demographic or purchase history data corresponding to the customer identification data (Block 112). These data are then used to determine products in which the customer may have an interest (Block 116). For example, a state of the art sound system may be selected for a customer whose zip code indicates a home in an affluent area and whose purchase history reveals several movie or musical CD-ROM purchases. The product identification data for these products of interest may then be used to query database 26 for location information (Block 120). A path is then generated using the kiosk location, customer selected product locations, and the locations for the products of interest (Block 124). These path data are then returned to kiosk 14 for display (Block 128) so the customer may view the path or the data may be printed for the customer, if a printer is also provided at kiosk 14. As noted above, one or more of the computers housed in kiosk 14 may be used to implement the method of FIG. 2.

Figure 3:
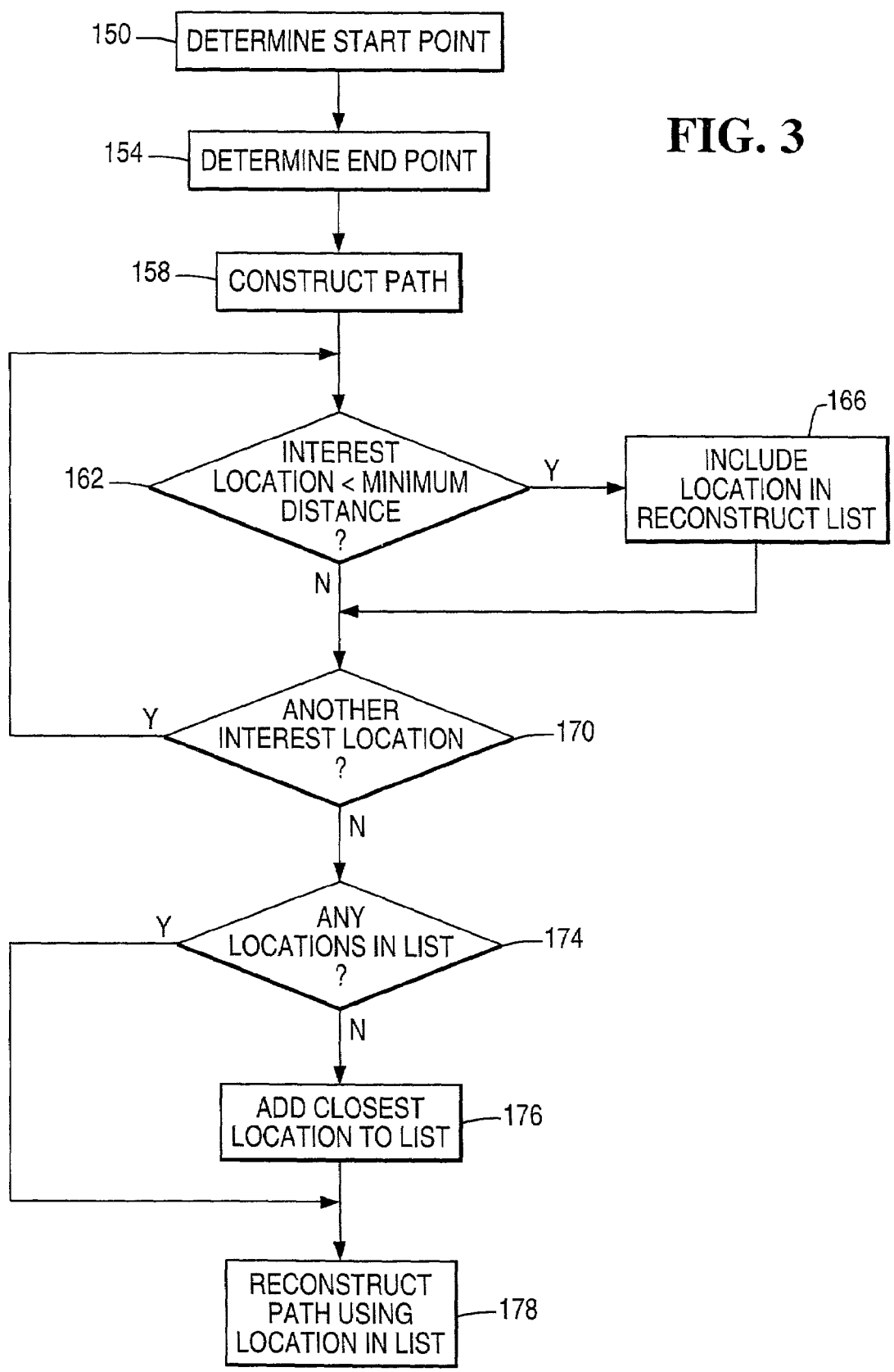
FIG. 3 is a flowchart of an exemplary method for constructing a path that includes the locations for products that may interest a customer.

An exemplary method implemented by a customer path generator in accordance with the principles of the present invention is shown in FIG. 3. The method begins by determining a starting point that corresponds with the kiosk location (Block 150). An endpoint is also determined using the location of the customer selected product (Block 154). A shortest distance path is then constructed from the starting point to the ending point (Block 158). The locations of the products of interest are then analyzed to determine which ones are within a minimum distance to this shortest distance path (Block 162). These locations are placed in a list of locations for path reconstruction (Block 166). This process continues until all the products of interest are analyzed (Block 170). The list is tested to determine whether any locations were stored in the list (Block 174). If the list contains locations of products of interest to the customer, the path is reconstructed to include those locations (Block 178). If none of the products of interest are within a minimum distance to the shortest path, the path is reconstructed to include the product of interest location that is the closest to the shortest path (Block 176). In constructing a path, aisle intersections are edited (map data) or described (textual directions) so paths deviating from the constructed path are not shown or described. This path construction reduces the likelihood that customers construct paths that avoid the products of interest.

While the present invention has been illustrated by the description of exemplary processes, and while the various processes have been described in considerable detail, it is not the intention of the applicant to restrict or in any limit the scope of the appended claims to such detail. For example, the method and system of the present invention may be used to modify an existing cart system so a path is displayed at a cart that directs a customer into the vicinity of products that may interest a customer. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for directing customers through a store to a customer selected product on a path that includes the location of a product in which the customer may have an interest to purchase comprising:
    receiving customer identification data and customer product selection data from a customer;
    generating customer interest data from said customer identification data; and
    generating a customer path to a location corresponding to said selected product identification data that includes a location corresponding to said customer interest data so that said customer following said generated path comes into the vicinity of a product in which the customer may have an interest to purchase on the way to the customer selected product.

2. The method of claim 1 further comprising:
    querying a database with said customer identification data to obtain a customer purchase history; and
    said customer interest generation using said customer purchase data to identify products in which a customer may have an interest to purchase.

3. The method of claim 1 wherein said customer path generation further comprising:
    constructing a shortest distance path between a kiosk location and a location corresponding to said selected product identification data; and
    reconstructing said constructed path to include at least one location of a product corresponding to said customer interest data.

4. The method of claim 3 wherein said location included in said reconstructed path lies within a minimum distance to said constructed path.

5. The method of claim 3 wherein said location included in said reconstructed path is the location of a product corresponding to said customer interest data that is closest to said constructed path.

6. The method of claim 3 wherein said customer path generation further comprising:
    editing aisle intersections in said customer path data for said reconstructed path to reduce the likelihood of said customer deviating from said reconstructed path.

7. The method of claim 1 wherein said data receipt further comprising:
    receiving date and time data; and
    said customer interest data generation using said date and time data to generate customer interest data.

8. The method of claim 1 wherein said receipt of data further comprising:
    reading demographic data from a customer token containing said customer identification data.

9. The method of claim 1 further comprising:
    querying a database with said customer identification data to obtain a customer demographic data; and said customer interest generation using said customer demographic data to identify products in which a customer may have an interest to purchase.

* * * * *